Jan. 14, 1958 L. L. SWAN 2,820,105

TELEPHONE CONFERENCE CIRCUIT

Filed April 24, 1956

INVENTOR
L. L. SWAN
BY Walter M. Hill
ATTORNEY

United States Patent Office 2,820,105
Patented Jan. 14, 1958

2,820,105

TELEPHONE CONFERENCE CIRCUIT

Luther L. Swan, Chicago, Ill., assignor to American Telephone and Telegraph Company, a corporation of New York Application April 24, 1956, Serial No. 580,369

8 Claims. (Cl. 179—81)

This invention relates to telephone circuits and more particularly to a conference circuit for telephone lines.

Heretofore, such conference circuits were not continuous in that they required the use of a push-to-talk switch and were thus not true two-way circuits. It is desirable that these circuits approximate the conditions existing when both speakers are in the same room. The conversation should flow without interruption and the speech levels should be such that those present in the conference room may hear equally well both the local speaker and the distant party. This has not always been so with prior telephone conference circuits. Prior attempts to meet these conditions have frequently resulted in singing caused by acoustical feedback due to an insufficient margin between the input level to the local microphone and the output level of the local loudspeaker.

It is the object of this invention to provide a true two-way loudspeaker conference circuit for telephone lines which requires no push-to-talk switch and which does provide sufficient volume to be easily heard by all conference members without incurring acoustic singing.

The foregoing object is achieved by this invention which provides a pair of amplifiers having their input circuits connected to a telephone signal source such as a local microphone through means capable of adjusting their relative input levels. Their output circuits are connected in substantially balanced relation to a local loudspeaker or other utilization circuit and in unbalanced relation to a telephone line leading to a distant party. Means is provided for adjustably unbalancing the output circuit sufficiently to provide a controlled transmission from the local microphone to the loudspeaker. Additional means independently adjusts the transmission from the microphone to the line and the level from the line to the loudspeaker.

Figure 1:
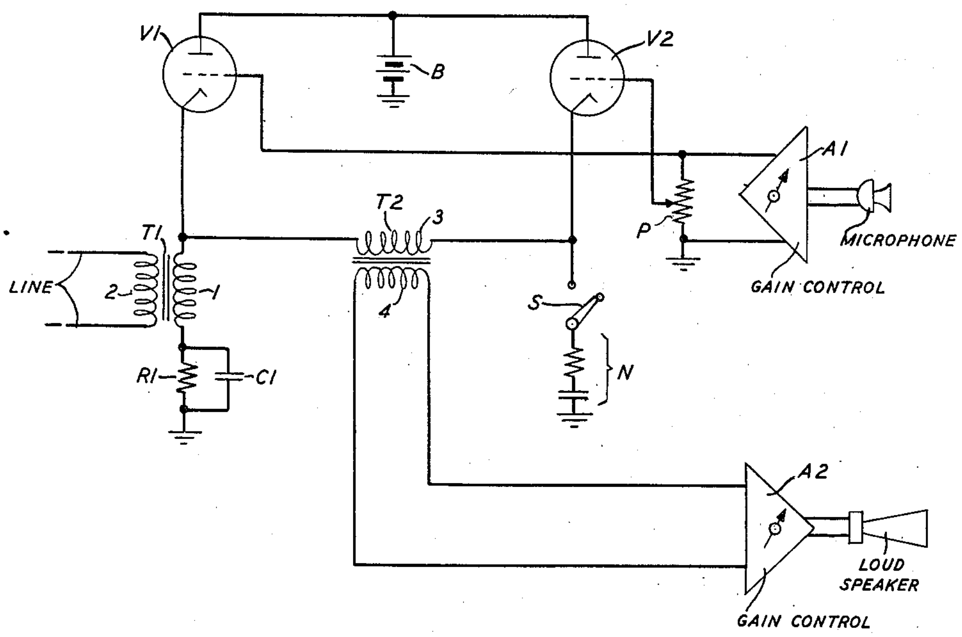

The invention may be better understood by reference to the accompanying drawings in which:

Fig. 1 discloses the circuits of a preferred embodiment of the invention; and

Figure 2:
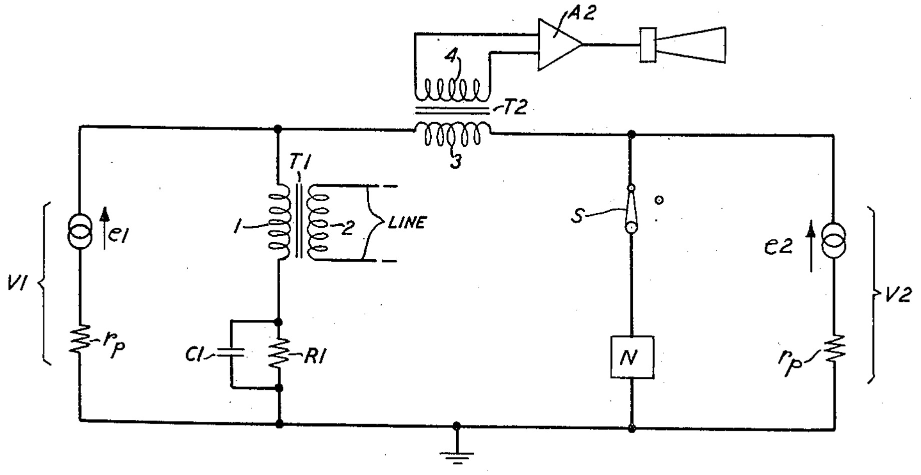

Fig. 2 discloses a simplified schematic of the circuit of Fig. 1 for explanatory purposes.

The conference circuit of Fig. 1 comprises a pair of vacuum tubes V1 and V2 connected as cathode followers. The anodes are connected to a source of plate voltage B, the negative terminal of which is grounded. The cathode circuit of tube V1 includes the transformer T1 having a secondary winding 2 connected to the telephone line. The primary winding 1 is connected on the one side to the cathode and on the other side to ground through a bias network comprising resistor R1 and by-pass capacitor C1. The cathode of tube V2 is connected to the cathode of tube V1 through the primary 3 of transformer T2. Thus, the bias resistor R1 provides the bias voltage for the grids of both tubes. The secondary winding 4 of transformer T2 is connected to a local loudspeaker circuit comprising an amplifier A2 and a loudspeaker. It is evident that any other conventional receiving circuit can be substituted for the loudspeaker.

For example, the output of transformer T2 may be coupled to one or more telephone receivers or headphones instead of to the loudspeaker system. The local microphone is connected to the grids of both tubes through a microphone amplifier A1. Here again it will be evident that other conventional telephone signal means can be substituted for the single microphone shown. For example, this can be another telephone line or it can be a plurality of microphones or telephone transmitters connected in parallel in place of the single microphone. This latter arrangement is useful in combination with an equal number of headphones to provide conference intercommunication between several remotely positioned television cameramen, their director and the studio. The invention may also provide coupling between a radio system and a telephone line by simply substituting the audio output circuit of a conventional radio receiver for the microphone and a conventional radio transmitter for the loudspeaker. The effect here is merely to interpose a radio link in the conference circuit. It will be noted that the grid of tube V1 is connected directly to the output of amplifier A1 while potentiometer P controls the relative level of voice signal applied to the grid of tube V2. It is obvious that other well-known circuits can be substituted to control the relative inputs to these two tubes. The one shown, however, is preferred.

A network N may be connected between the cathode of tube V2 and ground. This network is optional and is useful in some circuits to provide a more complete balance. It will be evident to those skilled in the art that a complete balance could be obtained if the impedance components of network N are equal to those presented by the line through transformer T1 and the bias network comprising resistor R1 and by-pass capacitor C1. A switch S is provided for conveniently connecting the network into the circuit when desired. This switch may be dispensed with and the network N permanently connected at the time the conference circuit is installed at the subscriber's premises. It is desirable that both amplifiers A1 and A2 include gain controls so that their output levels may be controlled when adjusting the circuit for proper operation.

The operation of the circuit of Fig. 1 will be more readily understood by reference to Fig. 2. This circuit is the equivalent of Fig. 1 where each of the tubes V1 and V2 has been replaced by its equivalent plate generator and plate resistance. For present purposes it may be assumed that the plate resistances $r_p$ are equal and that the generator voltages $e1$ and $e2$ are in phase but may differ in magnitude depending on the relative input levels supplied to the two tubes from the microphone circuit. If it is assumed that a network N is used having impedance components identical to those of transformer T1 and the bias network R1, C1, it will be evident that there will be no microphone output to the loudspeaker circuit through transformer T2 if the two generator voltages $e1$ and $e2$ are made equal. It will also be evident that an incoming signal from the line through transformer T1 will not be balanced out in transformer T2 so that this signal will be transmitted to the loudspeaker through its amplifier A2. By adjusting potentiometer P to change the signal level from the local microphone to vacuum tube V2, the generator voltage $e2$ is changed in magnitude to unbalance the circuit insofar as signals originating at the local microphone are concerned. The local speaker's voice may then be heard from the loudspeaker since the circuit, thus unbalanced, will transmit the microphone signal through transformer T2 to the loudspeaker circuit.

In practice it has been found that, for many subscriber's loops, a reasonably good balance may be obtained without the use of any network N. An adjustment of potentiameter P can be found which will permit the transmission of only a small signal through the local loudspeaker circuit. So long as this transmitted signal is sufficiently low, no compensating network N need be used. It has also been found that this network, where necessary, may frequently comprise simply a resistor and capacitor in series as shown in Fig. 1, the relative sizes being proportioned to give a sufficiently low microphone signal through the loudspeaker circuit.

The circuits of Fig. 1 may be conveniently balanced for satisfactory operation in the conference room by first adjusting the potentiometer P to give either no signal or a minimum transmission through the loudspeaker from the local microphone. The gain of amplifier A1 may then be adjusted until the local speaker's voice is clearly heard by the distant party. The gain of amplifier A2 is then adjusted until the distant party's voice is heard at a satisfactory level in the conference room. Finally, potentiometer P is moved away from the balance or minimum transmission point until the local speaker's voice is also heard with clarity through the loudspeaker in the conference room.

The apparatus will not sing if constructed as above described and properly balanced to provide a sufficient margin between the local speaker's voice level at the microphone and the loudspeaker level as received at the microphone. The placement of the microphone relative to the loudspeaker will ordinarily be in accordance with well-known practice in the use of public address systems.

While the invention has been described with particular reference to a telephone conference system for a room where a telephone line is accessible, the principles are equally adaptable to use with an interposed radio link as previously suggested. The circuits are the same as shown in Fig. 1 except that a conventional radio transmitter and receiver are installed in the conference room where a telephone line is not accessible. A second conventional radio transmitter and receiver is installed at a point accessible to a telephone line. The circuits of this invention are coupled to the telephone line as shown in Fig. 1. The second radio receiver is substituted for the microphone and the second radio transmitter is substituted for the loudspeaker. It will be noted that, except for the insertion of the conventional radio link, these circuits are no different from those shown in Fig. 1.

What is claimed is:

1. A two-way loudspeaker telephone circuit for a subscriber's telephone station comprising a first vacuum tube and a second vacuum tube, each including an anode, a cathode and a control electrode, means connecting both of said anodes to ground through a source of anode supply potential, a loudspeaker circuit having a pair of input terminals connected, respectively, to said two cathodes, means for coupling a telephone line between one of said cathodes and ground, a microphone, means for coupling said microphone to both of said control electrodes, said coupling means including means for adjusting the relative signal level between said two electrodes.

2. The combination of claim 1 and one variable gain amplifier included in said loudspeaker circuit and another variable gain amplifier included in said means for coupling the microphone to said control electrode.

3. The combination of claim 1 wherein said last-named coupling means comprises a potentiometer having a resistance means with two terminals and a slider, means connecting one of said terminals to one of said control electrodes and said slider to the other control electrode.

4. A two-way loudspeaker telephone circuit for a subscriber's telephone circuit comprising a first vacuum tube and a second vacuum tube, each including an anode, a cathode and a control electrode, means connecting both of said anodes to ground through a source of anode supply potential, a loudspeaker circuit having a pair of input terminals, a transformer having a primary and a secondary winding, means connecting said primary between said two cathodes, means connecting said secondary to said loudspeaker circuit input terminals, means for coupling a telephone line between one of said cathodes and ground, a microphone, means for coupling said microphone to both of said control electrodes, said coupling means including means for adjusting the relative signal level between said two electrodes.

5. A two-way loudspeaker telephone circuit for a subscriber's telephone station comprising a first vacuum tube and a second vacuum tube, each including an anode, a cathode and a control electrode, means connecting both of said anodes to ground through a source of anode supply potential, a loudspeaker circuit having a pair of input terminals connected, respectively, to said two cathodes, a line transformer having two windings, means for connecting one of said windings to a telephone line, means connecting said other winding between one of said cathodes and ground, a microphone, means for coupling said microphone to both of said control electrodes, said coupling means including means for adjusting the relative signal level between said two electrodes.

6. A two-way loudspeaker telephone circuit for a subscriber's telephone station comprising a first and a second amplifier means, each having an input circuit and an output circuit, a loudspeaker circuit coupled in substantially balanced relation to said two output circuits, means for coupling a telephone line in unbalanced relation to said two output circuits, a microphone circuit, and means for coupling said microphone circuit to said two input circuits, said coupling means including means for adjusting the relative signal level transmitted to said two input circuits.

7. A two-way telephone circuit for a telephone system comprising a first and a second amplifier means, each having an input circuit and an output circuit, a signal utilization means coupled in substantially balanced relation to said two amplifier output circuits, means for coupling a telephone line in unbalanced relation to said two amplifier output circuits, means providing telephone signals, and means for coupling said telephone signal means to said two input circuits, said coupling means including means for adjusting the relative signal level transmitted to said two input circuits.

8. A two-way telephone circuit for a telephone system comprising a first vacuum tube and a second vacuum tube, each including an anode, a cathode and a control electrode, means connecting both of said anodes to ground through a source of anode supply potential, a signal utilization means having a pair of terminals connected, respectively, to said two cathodes, means for coupling a telephone line between one of said cathodes and ground, means providing telephone signals, means for coupling said signal means to both of said control electrodes, said coupling means including means for adjusting the relative signal level between said two electrodes.

References Cited in the file of this patent

UNITED STATES PATENTS

| | | |
|---|---|---|
| 2,336,888 | Reier | Dec. 14, 1943 |
| 2,369,144 | Herrick | Feb. 13, 1945 |
| 2,369,351 | Herrick | Feb. 13, 1945 |
| 2,370,388 | Baird | Feb. 27, 1945 |